Sept. 6, 1960     J. A. ALDECOA     2,951,618
FILLING APPARATUS
Filed Oct. 19, 1956
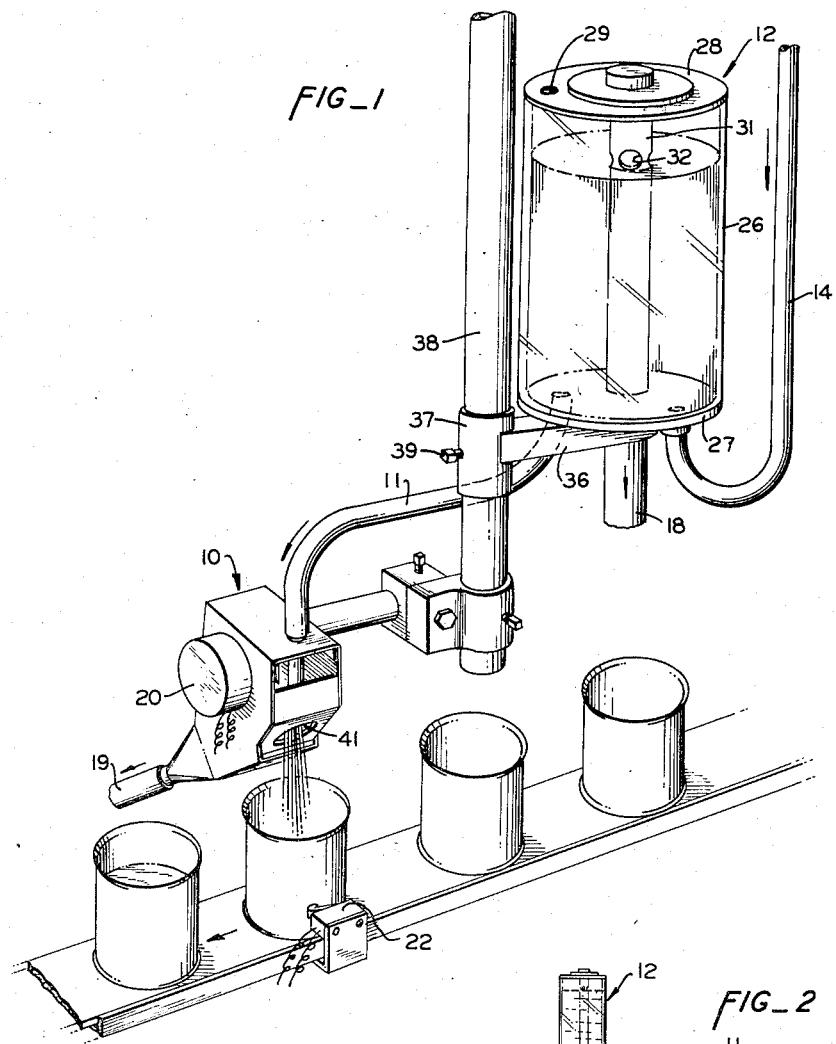
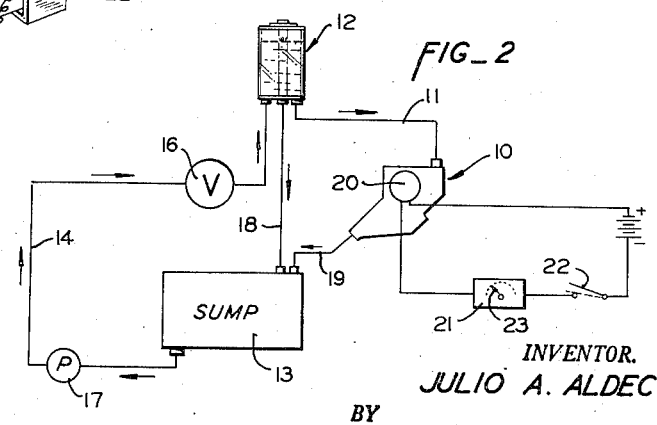
INVENTOR.
JULIO A. ALDECOA
BY
ATTORNEY

United States Patent Office 2,951,618
Patented Sept. 6, 1960

2,951,618
FILLING APPARATUS

Julio A. Aldecoa, East Palo Alto, Calif., assignor, by mesne assignments, to International Minerals & Chemical Corporation, Chicago, Ill., a corporation of New York Filed Oct. 19, 1956, Ser. No. 617,194

4 Claims. (Cl. 222—70)

The present invention relates to apparatus for dispensing a selected measured amount of liquid under a constant gravity head for the treatment of a product or the filling of a liquid into a container, and is concerned more particularly with apparatus of the above type in which containers to be filled or carrying the product to be treated are carried past a filling station where the desired amount of liquid is placed automatically into the container.

It is an object of the invention to provide an improved method and apparatus for dispensing a selected amount of liquid by utilizing a constantly available circulating source including a gravity tank, and by releasing the liquid from its normal circulating path under a constant gravity head from the tank for the required time in order to obtain the selected amount of liquid.

It is a further object of the invention to provide improved methods and apparatus of the above character in which the amount of dispensed liquid can be controlled accurately, and can be adjusted easily.

The above and other objects of the invention will be apparent from the following description of certain preferred methods and apparatus, taken in conjunction with the accompanying drawings, in which:

Figure 1 is a schematic perspective view of apparatus for carrying out the invention.

Figure 2 is a schematic flow diagram illustrating the various components of the apparatus.

In general the method and apparatus of the instant invention are concerned with providing a constant head gravity source of liquid through which circulation of volume of liquid at a constant rate is effected in one outlet path so that a desired amount of liquid to be dispensed can be measured accurately by diverting the flow of liquid from the circulating path for a given amount of time. Preferably a second by-pass or overflow outlet is provided to control the level of liquid, and an excess of liquid over and above the desired constant volume is fed to the tank for this purpose.

Referring to Figure 2 the apparatus includes a dispensing head 10 through which a constant volume of liquid flows through a discharge conduit or line 11 from a gravity feed tank 12. The gravity feed tank 12 is supplied with a flow of liquid from a sump 13 through a line 14 including a flow control valve 16 and a pump 17. The rate of flow from the sump 13 is in excess of the requirement of line 11 and an overflow return conduit 18 is provided leading from the gravity feed tank 12 to the sump 13, and a return conduit 19 is provided leading from the dispensing head 10 to the sump 13 for the constant volume circulating flow.

To control the amount of liquid dispensed a suitable electrical timer 21 is provided which is electrically connected to a suitable rotary solenoid 20 of the dispensing head 10 for controlling the dispensing gate thereof. A suitable switch 22 is incorporated in the circuit to prevent operation if no can is in position to receive the liquid. The timer 21 has a suitable adjusting control 23 for setting the time during which the dispensing head 10 is operated to divert liquid from the circulating path.

Referring to Figure 1, the gravity feed tank 12 includes a cylindrical outer wall 26 usually of glass and respective bottom and top plates 27 and 28 which are suitably clamped in liquid tight engagement with the ends of the outer wall 26. A vent hole 29 is provided in the top plate 28 and to this plate is suitably secured a pipe 31 forming a part of the overflow conduit 18 and having apertures 32 to determine the level of liquid in the tank.

The entire tank assembly 12 is carried by an arm 36 projecting from a mounting sleeve 37 adjustably secured on an upright frame pipe 38 by set screw 39. By appropriately adjusting the height of the gravity tank 12 with reference to its support an accurate adjustment of the height of liquid level can be obtained, and as a result a correspondingly accurate adjustment of the amount of fill can be obtained.

In operation the liquid is circulating constantly at a constant rate through the inlet conduit 14 to the gravity tank 12 and out through the overflow conduit 18, the rate of flow being such as to maintain the constant level of the gravity tank and thereby maintain the desired hydrostatic head. This serves in turn to maintain the desired constant flow from the tank 12 and thru the conduit 11 and the head 10. When the interceptor gate 41 of the dispensing head 10 is moved to allow escape of liquid for a selected time period, a desired amount of fill is obtained.

While I have shown and described a preferred form of the invention, it will be apparent that the invention is capable of variation and modification from the form shown so that the scope thereof should be limited only by the scope of the claims appended hereto.

I claim:

1. In a liquid filling machine of the character adapted to employ a constantly available stream of liquid and in which a selected volume of fill is dispensed in accordance with the time interval that the liquid is released or diverted from its normal circulating path into a container; a support, a tank mounted on said support, an inlet to said tank from said circulating path to receive the constantly available stream of liquid, a discharge conduit leading from said tank to form a part of said circulating path and receive a continuous gravity flow of liquid from said tank for filling of liquid into containers, means providing for constant level of liquid in said tank including an overflow return conduit leading from said tank to receive liquid tending to accumulate above said level for return to said path and return to said inlet, a dispensing head spaced below said tank and connected to said discharge conduit in said circulating path to receive said continuous gravity flow of liquid, said head having means providing a continuous free stream of liquid at said head and means for diverting the free stream of liquid from said path directly into a container, and a return conduit leading from said dispensing head to form a part of said circulating path and receive undiverted liquid from said free stream flowing in said path for return to said inlet.

2. In a liquid filling machine the structure as recited in claim 1 wherein said means providing for constant level of liquid in said tank is adjustable relative to said support to provide for control of the volume of fill to each container by controlling the hydrostatic pressure of the gravity flow of liquid flowing through said dispensing head.

3. In a liquid filling machine in which a selected volume of fill is dispensed in accordance with the time the liquid is released or diverted from its normal circulating path into a container; a sump providing a supply of liquid, a support, a tank mounted on said support and forming a part of said circulating path, an inlet to said tank, means connected between said sump and said inlet forming a part of said circulating path for supplying liquid to said tank, a discharge conduit leading from said tank to form a part of said circulating path and receive a continuous gravity flow of liquid from said tank for filling of liquid into containers, means providing for constant level of liquid in said tank including an overflow return conduit leading from said tank to said sump to receive liquid tending to accumulate above said level for return to said sump, a dispensing head spaced below said tank and connected to said discharge conduit in said circulating path to receive said continuous gravity flow of liquid, said head having means providing a continuous free stream of liquid at said head and means for diverting the free stream of liquid from said path directly into a container, and a return conduit leading from said dispensing head to said sump to form a part of said circulating path and receive undiverted liquid from said free stream flowing in said path for return to said sump.

4. In a liquid filling machine, the structure as recited in claim 3 wherein said tank is adjustably mounted on said support to provide for control of the volume of fill to each container by controlling the hydrostatic pressure of the gravity flow of liquid flowing through said dispensing head.

References Cited in the file of this patent

UNITED STATES PATENTS

| | | |
|---|---|---|
| 1,248,818 | Crouse | Dec. 4, 1917 |
| 1,331,615 | Brady | Feb. 24, 1920 |
| 2,018,538 | Webb | Oct. 22, 1935 |
| 2,434,771 | Mueller et al. | Jan. 20, 1948 |